Jan. 8, 1924.

F. C. SMITH

FOOT PEDAL MECHANISM

Filed May 11, 1922

1,480,421

Inventor
Frederick C. Smith

By Joseph L. Wright
Attorney

Patented Jan. 8, 1924.

1,480,421

UNITED STATES PATENT OFFICE.

FREDERICK C. SMITH, OF MARION, OHIO.

FOOT-PEDAL MECHANISM.

Application filed May 11, 1922. Serial No. 560,017.

*To all whom it may concern:*

Be it known that I, FREDERICK C. SMITH, a citizen of the United States, residing at Marion, in the county of Marion and State of Ohio, have invented certain new and useful Improvements in Foot-Pedal Mechanism, of which the following is a specification.

My invention relates to foot pedal mechanism for automobiles.

The object of my invention is the provision of a pedal or support which would form a suitable rest or bearing for the foot of the operator of an automobile which serves to operate the accelerator. The foot pedal operates in conjunction with the accelerator and in addition to serving as a support for the foot of the operator insures a uniform supply of fuel to the engine. Under ordinary conditions the pressure upon the accelerator by the foot of the operator varies, especially when driving over uneven surfaces.

The device comprises a foot plate having a heel and a toe portion. The plate as a whole is fastened to a rocking support which in turn is attached to a bracket fastened to the floor of the automobile. The bearing between the support and the bracket is provided with a friction device to hold the foot plate in any desired position.

The ordinary foot throttle or accelerator passes through the toe portion of the foot plate and is adapted to be engaged by the toe portion of the shoe of the operator. The foot throttle or accelerator is restored in the usual manner by an ordinary tension spring.

When the foot plate is operated by the foot of the operator the rocking support is tilted forward or backward and due to the friction device the foot plate remains in its set position when the foot of the operator is removed from the plate. When pressure is exerted by the foot of the operator toward the toe portion of the plate, the plate itself tilts downward and the shoe of the operator presses upon the foot throttle or accelerator so as to cause fuel to be supplied to the engine as desired. When pressure is removed from the plate the accelerator or foot throttle under tension of its own spring returns to a normal position thus reducing the supply of fuel to the engine.

The friction bearing is centrally located between the heel and toe portion of the plate and prevents any irregularity in the operation of the accelerator as it serves to steady or support the foot of the operator.

My invention is illustrated in the accompany drawings, wherein:—

Figure 1:
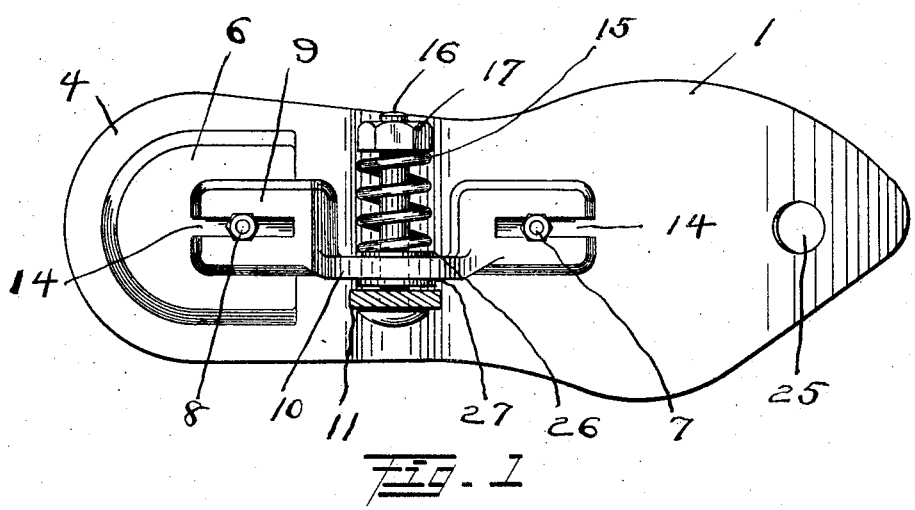
Figure 1 shows a bottom view of the device.

Referring to the drawings it will be noted that the device as a whole is fastened to the floor 13 of an automobile through which the accelerator or foot throttle 20 passes. As shown this accelerator passes through the opening 25 in the toe portion of the plate 1 of the device.

The bracket 11 is fastened to the floor by means of the screws or bolts 12. The upper portion of the bracket is fastened to the adjustable support 9. This support is provided with two slots 14 through which the bolts 7 and 8 pass in order to fasten it to the foot plate 1. By the provision of the slots the plate 1 can be rendered adjustable in a backward and forward position.

As shown in Figure 1 the bolt 16 passes through the support 9 and the bracket 11. Surrounding the bolt is a spiral tension spring 15 held in place by the adjusting nut 17. Interposed between the support 9 and the bracket 11 is a friction washer 27 and a similar washer 26 is interposed between the spring 15 and the support 9. By tightening the nut 17 the spring 15 is forced to contract and increase the friction between the support 9 and the bracket 11.

Figure 2:
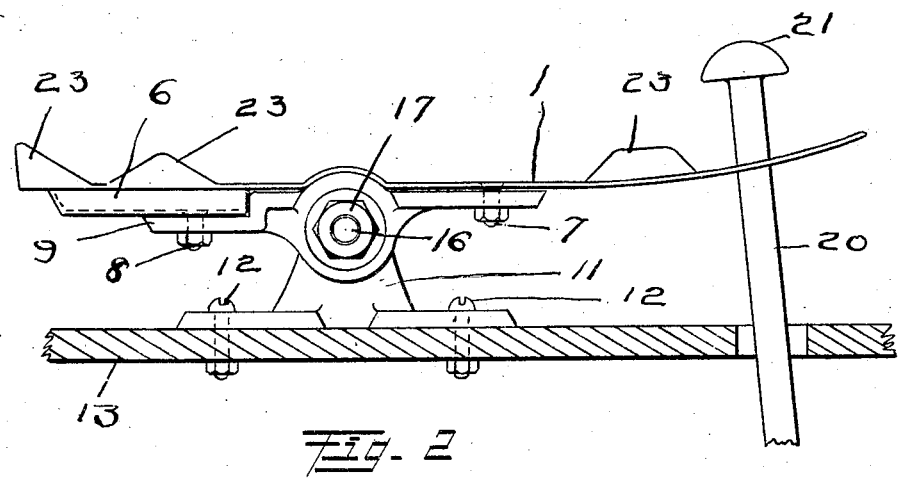
Figure 2 is a side view of the device.

As shown in Figures 1 and 2 the foot plate 1 is provided with a depressed heel portion 6 for accommodating the heel of a shoe and with the flanges 23 for preventing the foot of the operator slipping from the foot plate 1.

With the device shown and described, the foot plate as a whole is operated when pressure is exerted by the foot of the operator thus avoiding any irregularity in the operation of the accelerator so long as the foot of the operator rests upon the plate. After the foot pressure is removed the accelerator 20 is free to return to the normal position.

The device is so designed that the foot of the operator is equally balanced or supported between the heel and toe portions of the plate while the main foot pressure is exerted upon the central bearing itself.

This manner of equalizing the pressure and the provision of the accelerator device prevents any variation in the operation of the accelerator when driving over uneven surfaces.

When the operator presses his foot forward in a downward direction the accelerator 20 is depressed and the foot plate tilted forward and due to the friction device the foot of the operator is held in this position. The operator in order to decrease the supply of fuel exerts pressure upon the heel portion of the plate thus causing the plate to tilt backward and to lessen the supply of fuel.

Instead of providing the opening 25 in the toe portion of the plate, the plate itself can be shortened or removed from engagement with the accelerator 20 and the same results obtained, as the toe portion of the shoe of the operator would engage the accelerator in the manner previously described.

Having thus described my invention what I desire to secure by Letters Patent is:

1. In a foot pedal mechanism for automobiles, the combination of a foot plate for supporting the foot of an automobile operator, a support upon which said plate rests, a bracket adapted to be attached to the floor of the automobile and containing a bearing upon which said support rocks, means associated with said bearing for holding said support and foot plate in any desired position independent of the foot of the operator, an accelerator rod passing through said foot plate so that it is engaged by the foot of the operator in accordance with the position of said foot plate, the movement of said accelerator being independent of said foot plate.

2. In a foot pedal mechanism for automobiles, the combination of a foot plate for supporting the foot of an automobile operator, a support upon which said plate rests, a bracket adapted to be attached to the floor of the automobile and containing a bearing upon which said support rocks, means associated with said bearing for holding said support and foot plate in any desired position independent of the foot of the operator, an accelerator rod passing through said foot plate so that it is engaged by the foot of the operator in accordance with the position of said foot plate, the restoration of said accelerator rod being independent of said foot plate.

3. In a foot pedal mechanism for automobiles, the combination of a foot plate for supporting the foot of an automobile operator, a support upon which said plate rests, a bracket adapted to be attached to the floor of the automobile and containing a bearing upon which said support rocks, means associated with said bearing for holding said support and foot plate in any desired position independent of the foot of the operator, an accelerator rod associated with said foot plate, the movement of said accelerator rod being independent of said foot plate.

In testimony whereof I affix my signature in the presence of two witnesses.

FREDERICK C. SMITH.

Witnesses:
HUSTON S. YOUNG,
MARY OCHS.